Figure 1:
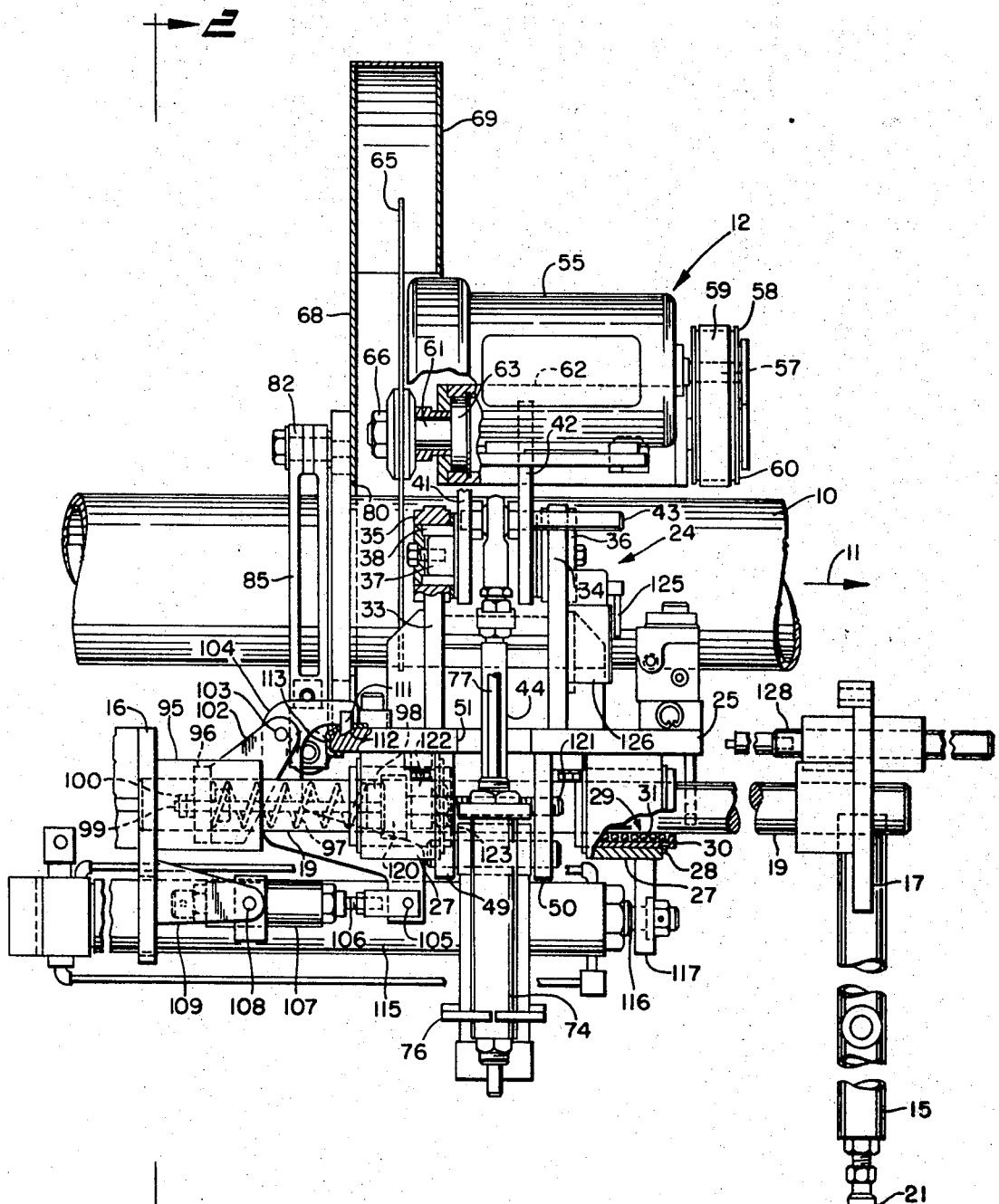

United States Patent

[11] 3,537,348

| [72] | Inventors | Harold J. Robins<br>Medina, and<br>William E. Tosko, Northfield, Ohio |
|---|---|---|
| [21] | Appl. No. | 809,094 |
| [22] | Filed | March 21, 1969 |
| [45] | Patented | Nov. 3, 1970 |
| [73] | Assignee | NRM Corporation<br>Akron, Ohio<br>a corporation of Ohio |

[54] PIPE SAW
22 Claims, 2 Drawing Figs.

[52] U.S. Cl. ................................................. 83/319,
83/338, 83/582
[51] Int. Cl. ...................................... B23d 25/00,
B23d 45/20
[50] Field of Search ............................................. 83/318-
—320, 338, 314, 582, 588, 589; 18/1(E), 2(J)

[56] References Cited
UNITED STATES PATENTS

| 1,453,458 | 5/1923 | Heinrichs .................. | 83/320X |
| 2,854,077 | 9/1958 | Novak et al ................ | 83/318X |
| 3,304,819 | 2/1967 | Pasternack .................. | 83/319X |
| 3,377,900 | 4/1968 | Baker ........................ | 83/319X |

Primary Examiner—William S. Lawson
Attorney—Oberlin, Maky, Donnelly and Renner

ABSTRACT: A flying cut-off for plastic pipe extruding lines and the like which includes a pivotally mounted saw supported on a carriage which includes linear low friction ball bushings mounting such carriage on guides extending parallel to the pipe movement, the acceleration of the carriage being obtained and the final velocity controlled by a compression spring, and clamps to hold the carriage for movement with the pipe after proper velocity is obtained.

INVENTORS
HAROLD J. ROBINS
WILLIAM E. TOSKO

INVENTORS
HAROLD J. ROBINS
WILLIAM E. TOSKO

BY
Oberlin, Maky, Donnelly & Renner
ATTORNEYS

PIPE SAW

This invention relates generally as indicated to a pipe saw and more particularly to a flying pipe saw for severing pipe or tubing into predetermined lengths.

In the production of pipe, particularly plastic pipe in extrusion lines, it is difficult accurately to sever such pipe into exact predetermined lengths. One of the problems involved is the acceleration of a saw to the speed of the travelling pipe. Should the pipe velocity change, it is difficult to adjust the acceleration of the saw to obtain a different final velocity. Piston-cylinder assemblies have been employed for this purpose, but it is difficult to control such assemblies to obtain different final velocities. Moreover, when velocities increase, acceleration time also increases, thus reducing the amount of time that the saw travels at final velocity. Changes in acceleration time make it difficult to cut exact lengths of pipe.

One of the principal objects of the present invention is the provision of a flying pipe saw having a spring accelerating, mechanism which may readily be adjusted to obtain different final velocities.

Another important object is the provision of such acceleration mechanism which has a constant acceleration time regardless of the final velocity obtained.

A further object is the provision of a simplified pipe saw which can readily be adjusted to obtain different final velocities corresponding to the movement of the work and still accurately sever the work into predetermined lengths.

Yet another object is the provision of a pipe saw having a pivotally mounted power driven saw, the cutting pressure of which is adjustable and substantially constant throughout the cut.

A still further object is the provision of a flying pipe saw utilizing ball bushings to obtain substantially friction-free movement thereby permitting the saw to be accelerated to its final velocity by a compressed spring.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 2:
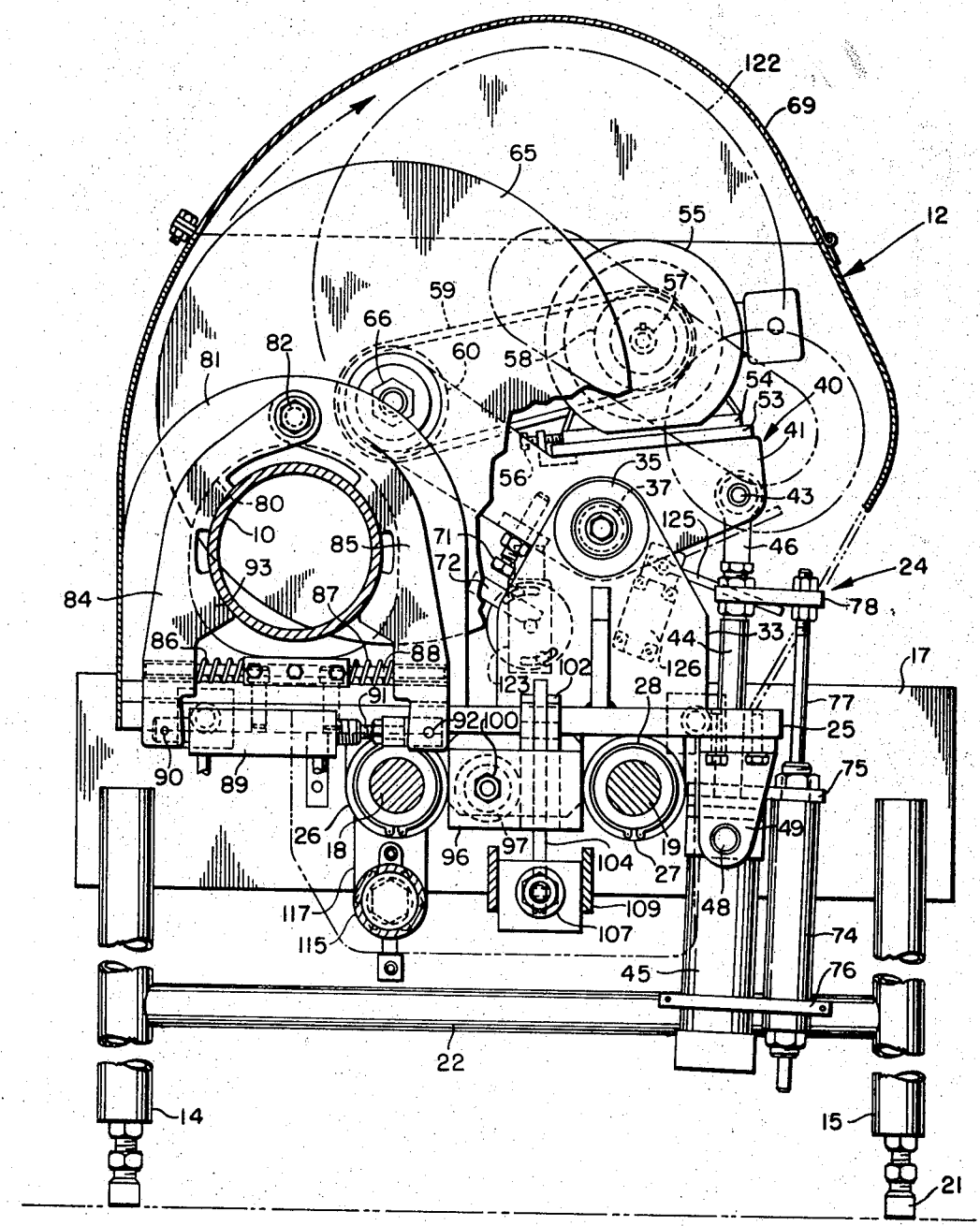

In said annexed drawings:

FIG. 1 is a side elevation partially broken away and in section of a pipe saw in accordance with the present invention; and FIG. 2 is a vertical section taken substantially on the line 2-2 of FIG. 1 showing the pipe saw in end elevation.

Referring now to the annexed drawings, there is illustrated plastic pipe 10 moving in the direction of the arrow 11 seen in FIG. 1. Such pipe may be at the exit end of an extruding line wherein it is desired to sever the pipe 10 into a plurality of lengths having the same linear dimension.

To accomplish this, there is provided the pipe saw shown generally at 12. The saw 12 is mounted on two pairs of legs 14 and 15, one pair at each end of the saw. Each pair of legs support a transverse frame plate as seen at 16 and 17 between which are secured parallel linear guide rods 18 and 19. Each leg is provided with an adjustable foot seen at 21 and a transverse tubular frame member 22 extends between each pair of legs. The legs, the transverse frame plate 16 and 17, and the guide rods 18 and 19 extending between such frame plates form a stand on which saw carriage 24 is mounted for movement along such guide rods. The legs may be adjusted so that the guide rods 18 and 19 extend parallel to the axis of the pipe 10.

The saw carriage 24 includes a horizontal plate 25 having depending therefrom aligned pairs of bushing housings 26 and 27. Secured by snap rings 28 in each housing are ball bushings 29. Such ball bushings include a sleeve 30 and three or more oblong circuits of balls 31, each of which has the balls in one of its straight flights in bearing contact between the inner surface of the sleeve 30 and the guide rod 19. The load is rolled freely along on the balls in this portion of the circuit and in the remainder of the circuit, the balls are free to roll in clearance provided in the sleeve. A retainer within the sleeve guides the balls in their proper path and prevents them from falling out when the bearing is removed from the shaft. Such ball bushings may, for example, be obtained from Thomson Industries, Inc. of Manhasset, New York. As illustrated, there will be four such ball bushings, two on each guide rod supporting the carriage 24 for linear movement in parallelism with the movement of the pipe 10.

On top of the plate 25 there is provided upstanding laterally spaced stanchions 33 and 34, each having aligned top hubs 35 and 36 in which is journaled the ends of pivot shaft 37 by suitable needle or like bearings 38. The pivot shaft 37 supports frame 40 comprised of parallel plates 41 and 42, the profile configuration of which is more clearly seen in FIG. 2. Such plates include a rearwardly offset portion and pin 43 extends therethrough. The rod 44 of piston-cylinder assembly 45 is connected to eye 46, the pin 43 extending through such eye between the plates 41 and 42. The cylinder of the assembly 45 is pivotally connected at 48 to depending ears 49 and 50 secured to the plate 25. The rod 44 extends through recess 51 in such plate 25.

The rearwardly extending portions of the plates 41 and 42 of the frame 40 support a platform 53 on which is adjustably secured the base 54 of drive motor 55. Adjustment may be obtained by the adjusting screw 56 with the motor being clamped in the desired position of adjustment. The shaft 57 of the motor has keyed thereto a timing belt sheave 58. Timing belt 59 extends about such sheave and about sheave 60 which is keyed to saw blade shaft 61. The shaft 61 is mounted in tubular housing 62 and journaled at both ends of such housing by suitable roller or like bearings seen at 63. The tubular housing is mounted on the forwardly offset portions of the plates 41 and 42 of the frame 40. A circular saw blade 65 is secured to the projecting end of the shaft by nut 66. A protective housing 68 encloses the saw blade, such housing having a hinged top cover 69.

Pivotal movement of the saw blade about the pivot shaft 37 is obtained by extension and retraction of the piston-cylinder assembly 45. Extension of such piston-cylinder assembly will pivot the frame 40 in a counterclockwise direction as viewed in FIG. 2 causing the saw blade 65 to move into the work 10 to the extent permitted by the adjustable stop 71 butting against fixed stop 72.

An adjustable saw feed rate regulator 74 is connected by brackets 75 and 76 to piston-cylinder assembly 45 and includes a rod 77 connected through arm 78 to the rod 44 of the piston-cylinder assembly 45. In this manner the feed rate of the saw through the work can be controlled and maintained.

The front wall of the housing 68 includes an opening 80 through which the pipe 10 extends and surrounding such opening is an inverted U-shape frame 81. The lower end of such frame is secured to the platform or plate 25 of the carriage. Pivotally interconnected at 82 at the top of such frame are clamps or pipe gripping jaw elements 84 and 85. Such jaw elements are normally held separated by springs 86 and 87 surrounding laterally projecting rod 88, the opposite ends of which fit loosely into the respective jaw elements. The lower ends of such jaw elements are interconnected by a piston-cylinder assembly 89, the cylinder being pivotally connected at 90 to the jaw element 84 while the rod 91 is pivotally connected at 92 to the jaw element 85. Retraction of the assembly 89 will pivot the jaw elements toward each other about the pivot 82 causing the inwardly directed projections 93 thereon to engage and grip the pipe P. Extension of the assembly 89 will separate the jaw elements permitting the pipe to move freely through the gripping jaw.

Extending between hubs 95, which are secured to the fixed plate 16 surrounding the guide rods 18 and 19, is an anchor plate 96. Extending from the anchor plate parallel to the rods 18 and 19 is a compression spring 97. The spring 97 extends between the plate 96 and cylindrical seat 98 on the end of rod 99 extending through such spring and through plate 96. Stop nuts 100 limit movement of the seat 98 to the right as seen in FIG. 1.

Also extending from the plate 96 is a pair of laterally spaced ears 102 between which is pivoted at 103 latch member 104. Such latch member is of the profile configuration more clearly seen in FIG. 1 and its lower end is pivotally connected at 105 to the rod 106 of piston-cylinder assembly 107. Such piston-cylinder assembly is pivotally connected at 108 to ears 109 projecting from the fixed plate 16.

The pivotally mounted latching member 104 includes a downwardly projecting latching finger 111 at its upper end having a lower cam surface 112 fitting within the latch recess in the plate 25. The edge of the plate is provided with a cam wear plate 113. When the plate 25 of the carriage is retracted to its start position, the wear plate automatically cams the latch finger into the recess in such plate. Extension of the piston-cylinder assembly 107 releases the latch finger from the plate.

Retraction of the carriage to the start position shown in FIG. 1 is obtained by piston-cylinder assembly 115, the rod 116 of which is connected to bracket 117 depending from the underside of the plate 25.

The spring seat 98 is adapted to contact adjustable pad 120 adjustably mounted on the underside of the carriage plate 25. The spring contact pad 120 is mounted on threaded stud 121 extending through boss 122 depending from the underside of the plate 25. The position of the spring contact pad can readily be controlled through the use of adjusting nut 123. A scale, not shown, may be attached to the carriage showing the operator the precise position to set the pad 120 to obtain the desired carriage final velocity.

In operation, upon receiving a signal to cut, the piston-cylinder assembly 107 is extended to release the latch element 111 from engagement with the carriage plate 25. This allows the spring 97 to transfer its stored energy to the carriage. In the absence of friction, all of the potential energy stored in the spring is converted to kinetic energy of the carriage, and the carriage is accelerated to a predetermined final velocity.

The compression of the spring 97 obtained by retraction of the piston-cylinder assembly 115 at the conclusion of the prior cut cycle stores a definite amount of energy in the spring. The amount of energy stored is obtained by adjustment of the pad 120, such energy being proportional to the square of the compression of the spring.

The velocity that the carriage attains is related to the mass of the carriage, the spring rate, the amount that the spring is compressed, and the frictional drag of the carriage on its ways or guides. The frictional drag presents a constant retarding force, and is reduced to a minimum by mounting the carriage on the prescribed very low friction linear ball bushings. The mass of the carriage is fairly well fixed by the design of the components that make it up, the object being to make it as light as possible and still keep it rugged enough to stand up under normal operating conditions.

The spring rate is then chosen to accelerate the carriage to its maximum required velocity with a reasonable compression of the spring. With the spring rate and the mass of the carriage determined, the final velocity attained is directly proportional to the amount that the spring is compressed.

Since the a carriage is always latched in the same starting position, by simply adjusting the spring contact pad 120 on the carriage in or out, the extent of compression of the spring can be controlled. This in turn controls the final velocity of the carriage.

Another advantage of the spring accelerator is that regardless of the final velocity, the acceleration time is constant. The spring and carriage comprise a simple spring-means vibratory system. When the carriage latch is released, the carriage and spring are in contact with each other for ¼ of the vibratory cycle, and the period of the vibratory cycle is a constant dependent only on the spring rate and the carriage mass. Thus the time for ¼ of a cycle to occur is ¼ of the natural period of the spring-mass system and is not related to the final velocity. Accordingly, regardless of the amount of spring compression and regardless of the final carriage velocity, the carriage will always achieve that final velocity in the same amount of time.

At the point where the carriage just leaves the spring 97, it trips a limit switch, not shown, to actuate pipe clamps 84 and 85. This is achieved by retraction of the piston-cylinder assembly 89. Simultaneously, the saw feed cylinder assembly 45 is actuated moving the saw blade from the phantom line position 122 seen in FIG. 2 through the pipe 10. The feed rate regulator 74 maintains a substantially constant cutting feed rate through out the cut.

Since the carriage has attained pipe speed, when the clamps close, the only force on the pipe is that required to overcome the frictional drag of the carriage on its guides, such having been reduced to a minimum through the use of the linear ball bushings. When the saw is completely through the pipe 10, it trips limit switch 123 which is rotatably adjustably mounted on the stanchion 33. This causes the piston-cylinder assembly 45 to retract returning the saw to its starting position 122. When the saw is returned, the lateral extension of pin 43 seen in FIG. 1 engages switch arm 125 of limit switch 126 extending the piston-cylinder assembly 89 to open the clamps 84 and 85. The carriage now coasts into shock absorber 128 and is stopped. At the end of its travel, the carriage trips a limit switch actuating the carriage return cylinder 115 which returns the carriage to its starting position where it is automatically latched against the acceleration spring 97. The latch element 111 is automatically cammed into the recess in the carriage plate holding the spring 97 compressed to the degree dictated by the position of the pad 120 to obtain a predetermined final velocity.

It can now be seen that there is provided a simplified cutoff for pipe and like elongated travelling work wherein the final velocity obtained is controlled simply by the extent of compression of the spring.

Other modes of applying the principles of the invention may be employed, change being made as regards the details described, provided the features stated in any of the following claims or the equivalent of such be employed.

We claim:

1. A flying cutoff for pipe and like elongated travelling work comprising a carriage, a work cutting tool on said carriage, guides extending parallel to the direction of travel of such work, low friction bearings mounting said carriage on said guides, compressed spring means operative to accelerate such carriage to the velocity of such work, and means to adjust the extent of compression of said spring means to obtain different velocities.

2. A flying cutoff as set forth in claim 1 wherein said work cutting tool comprises a circular saw and power means to push said saw through such work at a controlled speed.

3. A flying cutoff as set forth in claim 2 wherein said power means comprises a pneumatic piston-cylinder assembly, and an air pressure regulator for said assembly.

4. A flying cutoff as set forth in claim 1 wherein said low friction bearings are linear ball bearings.

5. A flying cutoff as set forth in claim 1 wherein said last mentioned means comprises an adjustable spring engaging pad mounted on said carriage.

6. A flying cutoff as set forth in claim 1 including clamp means operative to clamp the carriage to the work after it has been accelerated to the velocity of such work.

7. A flying cutoff as set forth in claim 1 including a retraction piston-cylinder assembly operative to return said carriage to its original position.

8. A flying cutoff as set forth in claim 1 including latch means operative to hold said carriage against said compressed spring means.

9. A flying cutoff as set forth in claim 1 including a retraction piston-cylinder assembly operative to compress said compressed spring means, and latch means operative to hold said carriage against said compressed spring means.

10. A flying cutoff for elongated travelling work comprising a carriage, low friction means mounting said carriage for movement parallel to the direction of movement of the work, a compression spring, an adjustable pad operative to engage and compress said spring in the starting position of said carriage, and means operative releasably to hold said carriage in such starting position.

11. A flying cutoff as set forth in claim 10 including latch means thus releasably to hold said carriage and a piston-cylinder assembly operative to release said latch means, and cam means operative automatically to engage said latch means upon return of said carriage.

12. A flying cutoff as set forth in claim 10 including a circular saw pivotally mounted on said carriage, such pivot axis being generally parallel to the work travel, and piston-cylinder means operative to pivot said saw into such travelling work.

13. A flying cutoff as set forth in claim 12 including a pressure regulator to obtain a controlled speed of the saw during the cutting stroke.

14. A flying cutoff as set forth in claim 12 including a work clamp on said carriage, both said work clamp and saw being actuated when said carriage leaves said spring.

15. A flying cutoff as set forth in claim 14 including means to release said work clamp when said saw returns to its starting position clear of the work.

16. A flying cutoff as set forth in claim 15 including means to stop said carriage, and means to return said carriage to starting position to cause said pad to engage said spring and compress the same to the extent dictated by the position of said pad.

17. A flying cutoff as set forth in claim 10 wherein said low friction means comprises circulating ball bushings.

18. A flying cutoff as set forth in claim 10 including means to adjust said pad to control the extent of compression of said spring and thus the velocity obtained by said carriage.

19. A flying cutoff as set forth in claim 10 wherein said spring is fixed and said adjustable pad is on said carriage.

20. A flying cutoff for elongated travelling and like work comprising a cutting carriage, low friction means for mounting said carriage for movement with the work, and spring means to accelerate said carriage to a predetermined velocity, and means operative to vary the velocity obtained without affecting the time of acceleration.

21. A flying cutoff as set forth in claim 20 wherein said last mentioned means comprises an adjustable pad operative to engage and compress said spring means in the starting position of said carriage.

22. A flying cutoff as set forth in claim 21 including means releasably to hold said carriage in starting position.